BASE-SHEET OF RECORD MATERIAL COATED ON THE REAR WITH MINUTE PRESSURE-RUPTURABLE CAPSULES CONTAINING LIQUID SOLUTION OF CHROMOGENIC MATERIAL DEVELOPABLE ON CONTACT WITH AN ELECTRON-ACCEPTING MATERIAL OF THE LEWIS-ACID TYPE TO COLORED FORM

RECEIVING SURFACE OF UNDERSHEET COATED WITH AN ELECTRON-ACCEPTING MATERIAL OF THE LEWIS-ACID TYPE

United States Patent Office 3,746,562
Patented July 17, 1973

3,746,562
MARK-FORMING RECORD MATERIALS
Chao-Han Lin, Dayton, Ohio, assignor to The National
Cash Register Company, Dayton, Ohio
Application Nov. 16, 1970, Ser. No. 90,097, now Patent
No. 3,681,390, which is a continuation-in-part of abandoned application Ser. No. 792,401, Jan. 21, 1969.
Divided and this application Sept. 28, 1971, Ser. No.
184,582
Int. Cl. B41m 5/22; C07d 5/34
U.S. Cl. 117—36.2
15 Claims

ABSTRACT OF THE DISCLOSURE

A chromogenic material of normally colorless form is disclosed, having a structural formula:

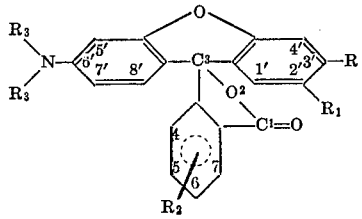

wherein one of $R_1$ and $R_2$ represents a chemical radical having the structure

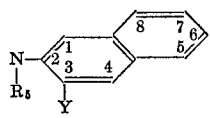

or a chemical radical having the structure

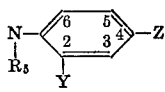

wherein $R_5$ represents an alkyl radical having less than five carbon atoms or hydrogen radicals, Z represents nitro-, amino-, dialkylamino-, alkyl radicals have less than five carbon atoms or hydrogen radicals, and Y comprises nitro-, amino-, carboxyl, hydrogen and ester radicals and the remaining other $R_1$ and $R_2$ comprises amino-, nitro-, hydrogen, alkyl having less than five carbon atoms, acetamido and halogen radicals; R comprises hydrogen radicals and alkyl radicals having less than five carbon atoms; and $R_3$ comprises alkyl radicals having less than five carbon atoms—said material assuming a colored form upon reactive contact with a Lewis acid molecule. Examples include 2'-(2-carboxyanilino)-6'-diethylaminofluoran;
2'-anilino-6'-diethylaminofluoran;
2'-(3-carbomethoxy-2-naphthylamino)-6'-diethylaminofluoran;
2'-(2-carbomethoxyanilino)-6'-diethylamio-3'-methylfluoran;
2'-(3-carboxy-2-naphthylamino)-6'-diethylamino-3'-methylfluoran;
6-(2-carboxyanilino)-2'-chloro-6'-diethylamino-3'-methylfluoran;
2'-(2-carboxy-4-nitroanilino)-6'-diethylaminofluoran;
6'-diethylamino-2'-(N-methylanilino)fluoran; and
6'-diethylamino-2'-(2,4-dinitroanilino)fluoran.

This is a division of application Ser. No. 90,097, filed Nov. 16, 1970, now Pat. No. 3,681,390 issued Aug. 1, 1972, which is a continuation-in-part of abandoned application Ser. No. 792,401, filed Jan. 21, 1969.

BACKGROUND OF THE INVENTION

This invention pertains to chromogenic compounds for use in pressure sensitive record material and to an improved mark-forming manifold system incorporating these chromogenic compounds. More specifically, this invention pertains to nitro- and aromatic amino-substituted dialkylamino fluorans which have the form of substantially colorless, i.e., white, or slightly colored solids, or approach being colorless when in liquid solution, but which may be converted to dark-colored forms upon reactive contact with appropriate acidic material. As used in mark-forming systems, marking in desired areas on support webs or sheets may be accomplished by effecting localized reactive contact between the novel chromogenic material ad the acidic material on or in such a web or sheet, such material being brought thereto by transfer, or originally there, in situ—the desired reactive contact forming dark-colored materials in the intended image areas.

This invention further, and in the most preferred embodiment, relates to such chromogenic compounds which, when placed in reactive contact with certain Lewis acid materials, yield neutral-colored, i.e., gray to black, reaction products. Other chromogenic compounds of this invention yield green, purple, gray-green or gray-purple reaction products. Such neutral-colored (black) reaction products find particular use in pressure-sensitive, mark-forming recording systems by virtue of their having improved stability on exposure to light and improved reproduction capabilities when copied by xerographic or diazo processes. The chromogenic compounds of the present invention are nitro- and aromatic amino-substituted fluorans.

Pressure-sensitive, mark-forming systems of the prior art include that disclosed in abandoned application for Letters Patent No. 392,404, filed Aug. 27, 1964, in the names of Robert E. Miller and Paul S. Phillips, Jr. The above-mentioned patent application provides a marking system of disposing on and/or within sheet support material, mutually reactant but unreacted mark-forming components (at least one component of which is a polymeric material) and a liquid solvent in which each of the mark-forming components is soluble—said liquid solvent being present in such form that it is maintained isolated by a pressure-rupturable barrier from at least one of the mark-forming components until an application of pressure causes a breach or rupture of the barrier in the area delineated by the pressure pattern. The mark-forming components thereby are brought into reactive contact, producing a distinctive mark.

It is an object of this invention to provide new and improved substances having chromogenic properties which may be incorporated in a web or coated onto the surface of a web to provide a manifolding unit, and which are, moreover, useful in carrying out improved methods of marking involving reactive contact with a color-activating material to yield dark-colored reaction products in areas where marking is desired.

It is another object of this invention to provide compounds, based upon the nitro- and aromatic amino-substituted dialkylamino fluorans disclosed herein which are substantially colorless, or slightly colored offering a new and improved variety of chromogenic characteristics, and yielding dark-colored substances upon contact with color-activating materials.

It is a further object of this invention to provide new and improved, normally substantially colorless, chromogenic substances yielding Lewis acid-reacted color products which exhibit improved color stability on exposure to light and improved reproduction capabilities when copied by xerographic or diazo processes.

It is further object of this invention to provide new and improved, normally substantially colorless, chromogenic substances yielding colored reaction products when placed in reactive contact with certain selected Lewis acid materials.

It is a further object of this invention to provide new and improved, normally substantially colorless, chromogenic substances yielding neutral-colored, i.e., gray to black, reaction products when placed in reactive contact with certain selected Lewis acid materials.

It is a further object of this invention to provide a new and improved mark-forming system which comprises disposing, within a web or upon the surface of a web or sheet-support-material, unreacted chromogenic material in a location suitable for subsequent reactive contact with an acidic material to produce dark-colored reaction products, thus providing means for making marks of desirable color intensity and hue.

In accordance with one feature of this invention, there is provided a substantially colorless or slightly colored, chromogenic compound having the structural formula:

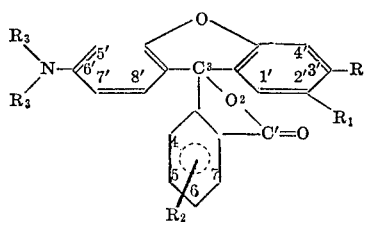

wherein one of $R_1$ and $R_2$ represents a chemical radical having the structure

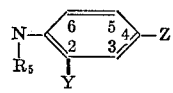

or a chemical radical having the structure

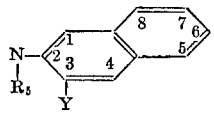

wherein $R_5$ represents an alkyl radical having less than five carbon atoms or hydrogen, Z represents nitro- amino-, dialkylamino-, alkyl radicals having less than five carbon atoms or hydrogen radicals, and Y comprises nitro-, amino-, hydrogen, carboxyl (—COOH) and ester (—COOR$_4$) radicals wherein $R_4$ represents an alkyl radical having less than five carbon atoms and the remaining one of $R_1$ and $R_2$ comprises amino-, nitro-, hydrogen, alkyl having less than five carbon atoms, acetamido and halogen radicals; R comprises hydrogen radicals and alkyl radicals having less than five carbon atoms; and $R_3$ comprises alkyl radicals having less than five carbon atoms. Examples of these compounds include 2'-(2-carbomethoxyanilino)-6'-diethylaminofluoran having the structural formula:

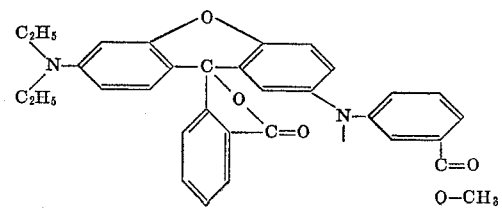

2'-(3-carboxy-2-naphthylamino)-6'-diethylaminofluoran having the structural formula:

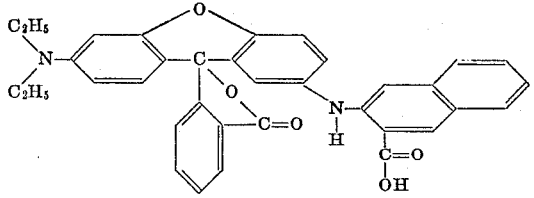

2'-(2-carboxyanilino)-6'-diethylamino-3'-methylfluoran having the structural formula:

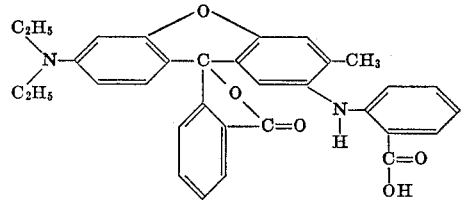

2'-anilino-6'-diethylamino-3'-methylfluoran having the structural formula:

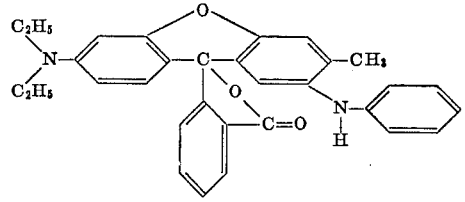

2'-(3-carbomethoxy-2-naphthylamino)-6'-diethylamino-3'-methylfluoran having the structural formula:

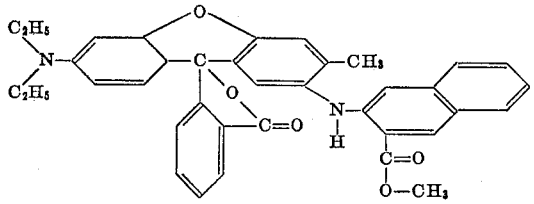

5-(2-carboxyanalino)-2'-chloro-6'-diethylamino-3'-methyl-fluoran having the structurral formula:

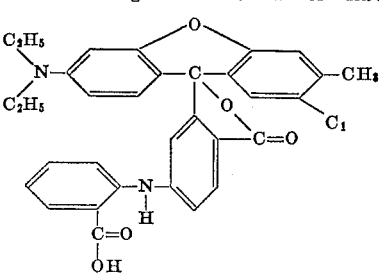

2'-(2-carboxy-4-nitroanilino)-6'-diethylaminofluoran having the structural formula:

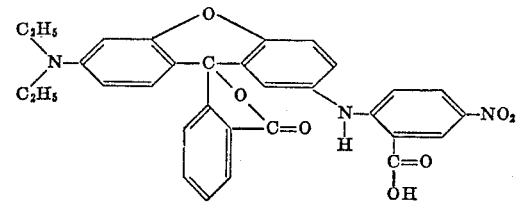

6'-diethylamino-2'-(N-methylanilino)fluoran having the structural formula:

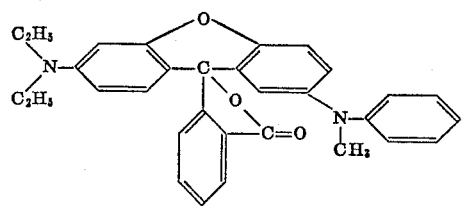

6'-diethylamino-2'-(2,4-dinitroanilino)fluoran having the structural formula:

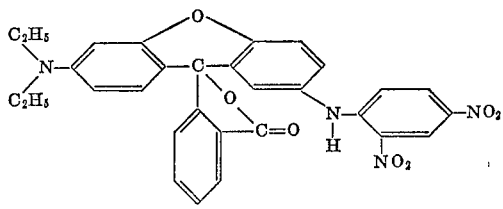

Other examples of these compounds that have been prepared include:

| Compound | Color | Melting point, °C. |
|---|---|---|
| 1 _____ 2'-anilino-6'-diethylaminofluoran | Green | 203–205 |
| 2 _____ 2'-(2-carboxyanilino)-6'-diethylaminofluoran | Neutral | 252–253 |
| 3 _____ 2'-anilino-6'diethylamino-3'-methylfluoran | do | 195–198 |
| 4 _____ 3'-diethylamino-7'-(p-toluidino)fluoran | Green | 183–184 |
| 5 _____ 3'-diethylamino-7'-(N-methylanilino)fluoran | do | 162–163 |
| 6 _____ 3'-diethylamino-6'-methyl-7'(p-toluidino)fluoran | Gray-green | 206–208 |
| 7 _____ 2'-anilino-6'-diethylamino-6-nitrofluoran | Green | 113–115 |
| 8 _____ 2'-anilino-6'-diethylamino-5-nitrofluoran | do | 264–266 |
| 9 _____ 2'-anilino-6'-diethylamino-6-aminofluoran | Neutral | 253–254 |
| 10 _____ 2'-anilino-6'-diethylamino-5-aminofluoran | Green | 263–265 |
| 11 _____ 3'-diethylamino-7'-(N-methylanilino)-6-nitrofluoran | do | (¹) |
| 12 _____ 3'-diethylamino-7'-(N-methylanilino)-5-nitrofluoran | do | (¹) |
| 13 _____ 3'-diethylamino-7'-(N-methylanilino)-6-aminofluoran | Neutral | (¹) |
| 14 _____ 3'-diethylamino-7'-(N-methylanilino)-5-aminofluoran | Gray-green | (¹) |
| 15 _____ 2'-anilino-6'-diethylamino-3'-methyl-6-nitrofluoran | do | 215–216 |
| 61 _____ 2'-anilino-6'-diethylamino-3'-methyl-6-aminofluoran | Purple-neutral | 148–150 |

¹ Not determined.

In accordance with another feature of this invention, a new composition of matter is disclosed which comprises a dark-colored product of chemical reaction having a resonant chemical structure and produced by contact of a color-activating material with one of the above-mentioned chromogenic compounds. The color-developing or activating material is an acidic substance useful for converting the chromogenic compounds to colored forms.

The method of marking of this invention, i.e., the method of developing a dark-colored material from substantially colorless or slightly colored chromogenic compounds, comprises providing a chromogenic compound selected from among the above-mentioned compounds and bringing such chromogenic compound into reactive contact with an acidic color-activating substance, in areas where marking is desired, to produce a dark-colored form of the chromogenic compound by the action thereon of said acidic substance.

Acidic materials employed in this invention can be any compound within the definition of a Lewis acid, i.e., any electron acceptor. Preferably, acidic organic polymers such as phenolic polymers are employed as the acidic material. The chromogenic materials exhibit the advantage of improved color stability when they are reacted with such phenolic polymers. Solution formation of solid particles of the polymeric material in a solvent system with the substantially colorless chromogenic compounds permits penetration of the dark-colored reaction product into a porous support sheet, e.g., paper, so that the colored form of the chromogenic materials is absorbed into the body of the sheet and is not merely on the surface of the sheet. The absorption feature provides protection against erasure of recorded data by attrition of the surface of a record sheet made in accordance with the present invention.

Preferred chromogenic materials of this invention are those which yield, as the dark-colored reaction product with above-described Lewis-acids, a neutral, i.e., gray to black substance. Such preferred chromogenic materials are eligible to be used in the preferred pressure sensitive record units and mark-forming units of this invention. It is understood that colors with respect to hue, saturation, and lightness are customarily identified in a largely subjective manner. Neutral "colors," i.e., shades which range from gray to black and which are substantially lacking in hue and saturation are also customarily identified in a subjective manner. An observer of the products resulting from reaction between preferred ones of the chromogenic materials of this invention and specified Lewis-acid reactive materials is immediately aware that such reaction products are substantially neutral in hue.

BRIEF DESCRIPTION OF THE DRAWING

The encapsulated solution is released on the event of rupture of the capsules in writing operations, as is shown in FIG. 2.

Figure 1:
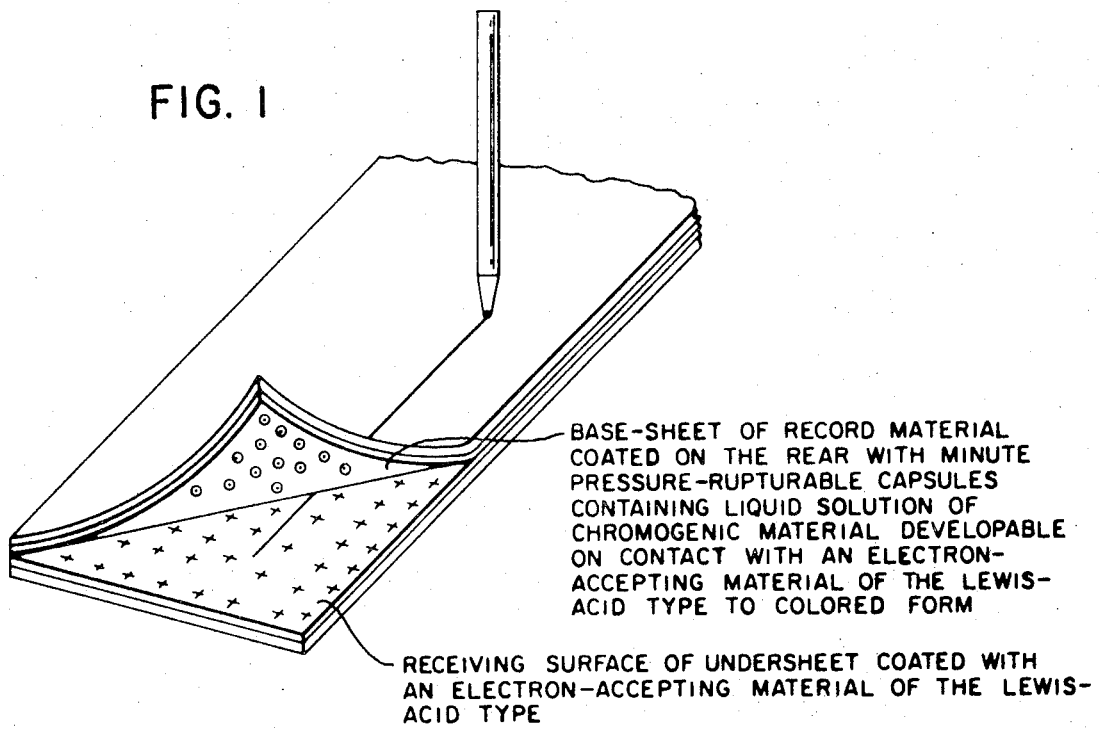
FIG. 1 is a diagrammatic representation of a two-sheet unit manifold, in perspective. The bottom surface of the overlying sheet is supplied on the surface or near the surface with a multiplicity of minute pressure-rupturable microcapsules containing a solution of the novel, substantially colorless, chromogenic component. An acidic component, such as an acid clay or a phenolic polymeric material lies within the lower web or undersheet or upon the upper surface of the lower web or undersheet. A colored mark is made by the use of a stylus, a type character, or other pressure-exerting means applied to the two-sheet unit manifold.
Figure 2:
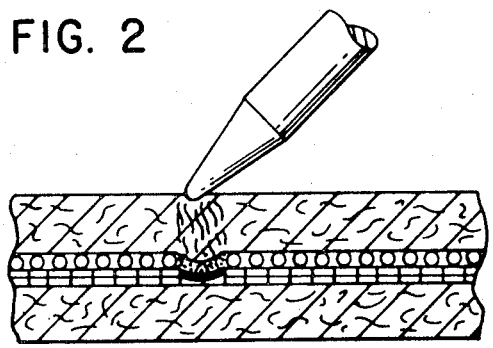
FIG. 2 is a sectioned view of the two-sheet manifold of FIG. 1. The elements are not to scale and are so-shown in order to more effectively depict their interrelation. The released solution is transferred from the overlying or base sheet to the receiving surface of the underlying sheet in conformance with the pressure pattern of the writing operation. The drawing shows that the top of the underlying sheet is coated or impregnated with a material reactant with the chromogenic material, e.g., an acid clay or an acidic phenolic polymer material; and that capsules are present on the overlying or base-sheet which capsules contain a liquid solution of chromogenic material. In another embodiment of the record material, however, the capsules can contain the polymeric phenolic material in liquid solution and the receiving surface of the underlying sheet can be supplied with the chromogenic material. The improvement in the system resides in the chromogenic material, which chromogenic material is the substance of the instant invention.

Referring again to FIG. 1, comprising an overlying or base-sheet having the chromogenic material located within or upon the sheet; it is possible to incorporate the chromogenic material in a solid, crystalline, state in a binder material so that the chromogenic material may be transferred from the overlying sheet, upon the application of pressure, to deposit some of the chromogenic material on the receiving surface of the undersheet, which receiving surface carries a color-activating polymeric material. Preferably, the chromogenic substance is dissolved in an appropriate solvent and minute droplets of the solution of the chromogenic material are encapsulated in minute, rupturable, capsules. It is apparent that many other arrangements are possible, including different configurations and relationship of the solvent and all of the mark-forming materials with respect to their encapsulation and location on the supporting underlying or overlying sheets or webs can be envisioned. Such arrangements are thoroughly described in the aforementioned application Ser. No. 392,404 in the names of Miller et al. and need not be repeated herein.

SUMMARY OF THE INVENTION

It is noted that the polymeric mark-forming components should have a common solubility with the chromogenic material in at least one liquid solvent when the acid-reacting material is a phenolic or other acidic organic polymer. It is also noted that in a single system several chromogenic materials may be used with the same or different polymeric materials. Several polymeric materials can be reactively contacted with a single chromogenic compound or with a mixture of chromogenic compounds.

As mentioned above, the solvent can be maintained in physical isolation in minute droplets until such time as it is released by application of pressure. This may be accomplished by several known techniques, but, preferably, isolation is maintained by encapsulation of individual droplets of the solvent in a microcapsule according to the procedures described, for example, in U.S. Pat. No. 2,712,507, issued July 5, 1955 on the application of Barrett K. Green; 2,730,457, issued Jan. 10, 1956 on the application of Barrett K. Green and Lowell Schleicher; 2,800,457, issued July 23, 1957 on the application of Barrett K. Green and Lowell Schleicher; 2,800,458, issued July 23, 1957 on the application of Barrett K. Green, reissued as Reissue Pat. No. 24,899 on Nov. 29, 1960; and 3,041,289 issued June 26, 1962 on the application of Bernard Katchen and Robert E. Miller. The microscopic capsules, when disposed within or upon a supporting web as a multiplicity in contiguous juxtaposition, are rupturable by pressure, such as normal marking pressure found, for example, in writing or typing operations.

The material or materials chosen as the wall material for the droplet-containing microcapsules, in addition to being pressure rupturable, must be inert or unreactive with respect to the intended contents of the capsules and the other mark-forming components so that the capsule wall material will remain intact under normal storage conditions until such time as it is released by an application of marking pressure. Preferred examples of eligible capsule wall materials include gelatin, gum arabic and many others thoroughly described in the aforementioned patents.

For most uses in record material, the capsule size should not exceed about 50 microns in diameter. Preferably, the capsules should be smaller than about 15 microns in diameter.

The acidic organic polymeric material useful for developing the color of chromogenic compounds in this invention include phenolic polymers, phenol acetylene polymers, maleic acid-rosin resins, partially of wholly hydrolyzed styrene-maleic anhydride copolymers and ethylenemaleic anhydride copolymers, carboxy polymethylene and wholly or partially hydrolyzed vinylmethylethermaleic anhydride copolymer and mixtures thereof.

More specifically, phenolic polymers found useful include alkyl-phenol acetylene resins, which are soluble in common organic solvents and possess permanent fusibility in the absence of being treated by cross-linking materials. Another specific group of useful phenolic polymers are members of the type commonly referred to as "novolacs," (a type of phenolformaldehyde polymeric material) which are characterized by solubility in common organic solvents and which are, in the absence of cross-linking agents, permanently fusible. Resol resins, if they are still soluble, may be used, though they are subject to change in properties upon aging. Generally, phenolic polymer material found useful in practicing this invention is characterized by the presence of hydroxyl groups and by the absence of groups such as methylol, which tend to promote infusibility or cross-linking of the polymer, and, further, by being soluble in organic solvents and relatively insoluble in aqueous media. Again, it should be remembered that mixtures of these organic polymers and other acidic materials can be employed.

A laboratory method useful in the selection of suitable phenolic resins is the determination of the infrared absorption pattern. It has been found that phenolic resins which undergo absorption in the 3200–3500 cm.$^{-1}$ region (which is indicative of hydroxyl groups) on the resin molecules and which do not absorb in the 1600–1700 cm.$^{-1}$ region are eligible. This latter absorption region is indicative of desensitization of hydroxyl groups which desensitization renders such groups unavailable for reaction with the chromogenic materials.

The preparation of some organic polymeric materials useful for practicing this invention has been described in "Industrial and Engineering Chemistry," volume 43, pages 134 to 141, January 1951, and a particular polymer thereof is described in Example I of U.S. Pat. No. 2,052,093, issued to Herbert Hönel on Aug. 25, 1936. The preparation of the phenol-acetylene polymers has been described in "Industrial and Engineering Chemistry," volume 41, pages 73 to 77, January 1949. The preparation of maleic anhydride copolymers is described in the literature, such as, for example, one of the maleic anhydride vinyl copolymers, as disclosed in "Vinyl and Related Polymers," by Calvin E. Schildknecht, second printing, published April 1959, by John Wiley & Sons, Incorporated: see pages 65 to 68 (styrene-maleic anhydride copolymer), 530 to 531 (ethylene-maleic anhydride copolymer), and 628 to 630 (vinylmethylethermaleic anhydride copolymer).

When the acidic material used as a mark-forming component in the present invention is one of the aforementioned organic polymers, the liquid solvent chosen must be capable of dissolving it. The solvent may be volatile or nonvolatile, and a single- or multiple-component solvent may be used which is wholly or partially volatile. Examples of volatile solvents useful in practicing the present invention include toluene, petroleum distillate, perchloroethylene, and xylene. Examples of nonvolatile solvents include high-boiling-point petroleum fractions and chlorinated biphenyls. Generally, the solvent chosen should be capable of dissolving at least about 0.3 percent, by weight, of the chromogenic material, and at least about 3 to 5 percent, by weight, of the acidic polymeric material to yield an effective reaction. However, in the preferred system, the solvent should be capable of dissolving an excess of the polymeric material, so as to provide every opportunity for utilization of the chromogenic material and, thus, to assure maximum coloration at the reaction site.

A further criterion for selection of the solvent is that the solvent must not interfere with the mark-forming reaction. In some instances, the presence of the solvent may be found to interfere with the mark-forming reaction or diminish the intensity of the mark, in which instances the solvent chosen should be sufficiently volatile to assure its removal from the reaction site soon after having brought the mark-forming components into reactive contact so that the mark-forming reaction can proceed.

Since the mark-forming reaction requires that an intimate mixture of the components be brought about through solution of said components, one or more of the mark-forming components can be dissolved in solvent droplets isolated by encapsulation, the only requirement being that at least one of the components essential to the mark-forming reaction be maintained isolated until the mark-forming reaction is desired.

In the usual case, the mark-forming components are so chosen as to produce a mark upon application of pressure to a coated system of sheets at room temperature (20 to 25 degrees centigrade). However, the present invention also includes a system wherein the solvent component is not liquid at temperatures near room temperature but is liquid and in condition for forming solutions only at elevated temperatures.

The support sheet member on which components of the system are disposed may comprise a single or a dual sheet assembly. In the case where all components are disposed on a single sheet, the record material is referred to as a "self-contained" or autogenous system. Where there must be a migration of solvent, with or without the mark-forming component, from one sheet to another, the record material is referred to as a "transfer" system. (Such a system may also be referred to as a "two-fold" system, in that at least two sheets are required and each sheet includes a component, or components, essential to the mark-forming reaction.) Where an adequate amount of the colored reaction product is produced in liquid or dissolved form on a surface of one sheet, a colored mark can be recorded on a second sheet by transfer of the colored reaction product.

In a preferred case, where microcapsules are employed, they can be present in the sheet support material either disposed therethrough or as a coating thereon, or both. The capsules can be applied to the sheet material as a dispersion in the liquid vehicle in which they were manufactured, or, if desired, they can be separated from the vehicle and thereafter dispersed in a solution of the acid-reacting polymeric component (for instance, 30 grams of water and 53 grams of a 1 percent, by weight, aqueous solution of polyvinylmethylether-maleic anhydride) to form a sheet-coating composition in which, because of the inertness of the solution and the capsules, both components retain their identity and physical integrity. When this composition is disposed as a film on the support material and dried, the capsules are held therein subject to release of the contained liquid by rupture of the capsule walls. The latter technique, relying on the inertness of the microcapsule and the dispersing medium of the film-forming mark-forming polymeric component, provides a method for preparing a sensitive record material coating having the capsules interspersed directly in a dry film of the polymeric material as the film is laid down from solution. A further alternative is to disperse one or more mark-forming components, and the chromogenic-material-containing microcapsules in a liquid medium not a solvent for either the mark-forming component or the microcapsules, with the result that all components of the mark-forming system may be disposed on or within the support sheet in the one operation. Of course, the several components may be applied individually. The capsules can also be coated onto a sheet as a dispersion in a solution of polymeric material which is not necessarily reactive with the capsule-contained solution of chromogenic materials.

The respective amounts of the several components can be varied according to the nature of the materials and the architecture of the record material unit desired or required. Suitable lower amounts include, in the case of the chromogenic material, about 0.005 to 0.075 pound per ream (a ream in this application meaning five hundred (500) sheets of 25" x 38" paper, totalling 3,300 square feet); in the case of the solvent, about 1 to 3 pounds per ream; and in the case of the polymer, about 0.5 pound per ream. In all instances, the upper liimt is primarily a matter of economic consideration.

The slurry of capsules can be applied to a "wet" web of paper, for example, as it exists on the screen of a Fourdrinier paper machine, so as to penetrate the paper web a distance depending on the freeness of the pulp and the water content of the web at the point of application. The capsules can be placed directly in or on a paper or support sheet. Not only capsule structures, but continuous films which contain a multitude of microscopic, unencapsulated, droplets for local release in an area subjected to pressure can be utilized. (See, for example, U.S. Pat. No. 2,299,694 which issued Oct. 20, 1942, on the application of Barrett K. Green.)

With respect to the acidic organic polymeric component, a solution thereof in an evaporable solvent can be introduced into an amount of water and the resulting mixture can be agitated while the evaporable solvent is blown off by an air blast. This operation leaves an aqueous colloidal dispersion slurry of the polymeric material, which may be applied to finished paper so as to leave a surface residue, or the slurry may be applied to a "wet" web of paper or at the size-press station of a paper making machine. In another method for making a polymer-sensitized sheet, the water-insoluble polymer can be ground to a desired or required particle size in a ball mill with water, preferably with a dispersing agent, such as a small quantity of sodium silicate. If a binder material of hydrophilic properties is ground with the polymeric material, the binder itself may act as a dispersant. If desired, an amount of binder material of up to 40 percent, by weight, of the amount of polymeric material can be added to the ball-milled slurry of materials—such binder materials being of the paper coating binder class, including, for example, gum arabic, casein, hydroxyethylcellulose, and latexes (such as styrene-butadiene copolymer). If desired, oil absorbents in the form of fuller's earths may be combined with the polymeric material particles to assist in retaining, in situ, the liquid droplets of chromogenic material solution to be transferred to it in data-representing configuration, for the purpose of preventing "bleeding" of the print.

Another method for applying the chromogenic or polymeric material individually to a single sheet of paper is by immersing a sheet of paper in 1–10 percent, by weight, solution of the material in an evaporable solvent. Of course, this operation must be conducted individually for each reactant, because if the other reactant material were present, contact of the reactants would result in a premature coloration over the sheet area. A dried sheet with one component can then be coated with a solution of another component, the solvent of which is a non-solvent to the already-supplied component.

The polymeric material can also be dissolved in ink composition vehicles to form a printing "ink" of colorless character and, thus, may be used to spot-print a proposed record-sheet-unit sensitized for recording, in a reaction-produced color in those spot-printed areas, by application of a solution of the chromogenic material. In the case of phenolic polymer, a printing ink may be made of up to 75 percent, by weight, of the phenolic polymeric material in a petroleum-based solvent—the ink being built to a viscosity suitable for printing purposes. The relative amounts of reactive, mark-forming, components to be used in practice of this invention, are those most convenient and economical amounts consistent with adequate, desired or required visibility of the recorded data. The resolution of the recorded data is dependent on, among other things, particle or capsule size, distribution and amount of particles or capsules, liquid solvent migration, chemical reaction efficiency, and other factors, all of which can be optimized empirically by one skilled in the art. Such factors do not determine the principle of the present invention, which invention, in part, relates to means for enabling the bringing into solution contact, by marking pressure, two normally solid, chemically reactive, components dissolved in a common liquid solvent component held isolated as liquid droplets. The isolated liquid droplets are preferably in marking pressure-rupturable capsules having polymeric-film walls, or are isolated, as a discontinuous phase, in a continuous marking pressure-rupturable film.

In the color system of this invention the acidic mark-forming material reacts with the chromogenic material to effect distinctive color formation or color change. In a multi-sheet system in which an acidic organic polymer is employed, it may be desirable to include other materials to supplement the polymer reactants. For example, kaolin can be added to improve the transfer of the liquid and/or the dissolved materials between the sheets. In addition, other materials such as bentonite, attapulgite, talc, feldspar, halloysite, magnesium trisilicate, silica gel, pyrophyllite, zinc sulfate, calcium sulfate, calcium citrate, calcium phosphate, calcium fluoride, barium sulfate and tannic acid can be included.

Various methods known to the prior art and others disclosed in the aforementioned abandoned application Ser. No. 392,404 in the names of Miller et al. and in U.S. Pat. 3,455,721 issued July 15, 1969 on the application of Phillips et al. can be employed in compositions useful for coating mark-forming materials into supporting sheets. An example of the compositions which can be coated onto the receiving surface of an underlying sheet of a multi-sheet to react with a capsule coating on the underside of an overlying sheet is as follows:

| Coating composition: | Percent by weight |
|---|---|
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

Having disclosed, generally, the chromogenic materials of this invention and preferred methods for utilizing the novel chromogenic materials, in combination with other materials, as reactive components in mark-forming record material; examples will now be disclosed wherein preparation of several of the chromogenic materials is described.

EXAMPLE 1

Preparation of 2'-(2-carboxyanilino)-6'-diethyl aminofluoran

2'-amino-6'-diethylaminofluoran, a starting material in the reaction of this example, is prepared as follows: 2.2 parts, by weight of 2-carboxy-4'-diethylamino-2'-hydroxybenzophenone, 1 part, by weight, of p-nitrophenol, and 40 parts, by weight, of 90 percent, by weight, sulfuric acid are heated together for about one hour at 150 degrees centigrade. The mixture is then poured onto about 225 parts, by weight, of ice and made alkaline to a pH of about 8 by addition of dilute ammonium hydroxide. The alkaline system is extracted by benzene and the benzene is washed with 10 percent, by weight, aqueous sodium hydroxide solution and then water. The washed benzene extract is then evaporated to dryness and the residue is chromatographically purified over alumina and then recrystallized from benzene-petroleum ether. The purified product is reduced with stannous chloride solution to yield 2'-amino-6'-diethylaminofluoran, having a melting point of about 214 degrees centigrade.

To obtain the title compound of this example: 7.8 grams of the above-prepared 2'-amino-6'-diethylaminofluoran, 4.0 grams of o-bromobenzoic acid, 2.8 grams of potassium carbonate, 0.1 gram of copper powder, and 50 milliliters of n-amyl alcohol were refluxed for about 3 hours. The reaction mixture was cooled and low-boiling-point petroleum ether was added to cause separation of the crude reaction product. 4.6 grams of a black solid was recovered and was chromatographicaly purified over silicon dioxide and then precipitated from a 5 percent, by weight, aqueous solution of sodium bicarbonate using dilute hydrochloric acid. A benzene solution of the purified product imparted a black color to paper coated with a mixture of kaolin and phenolic polymer.

EXAMPLE 2

Preparation of 2'-(2-carbomethoxyanilino)-6'-ethylaminofluoran 1.0 gram of the crude reaction product prepared in Example 1, above, was refluxed for about 15 minutes with 0.3 gram of dimethyl sulfate, 0.5 gram of dicyclohexylamine, and 15 milliliters of acetone to methylate the crude product. Solvent was then evaporated from the system until the system became syrupy and then the system was heated over a steam bath for an additional 15 minutes. The system was extracted with 50 milliliters of benzene and the benzene solution was run through an activated alumina chromatograph column using a solution of benzene-diethyl ether-ethyl acetate (2:2:1, by volume, respectively) as eluant. The eluate was concentrated by evaporation and then, to crystallize the reaction product, low-boiling-point petroleum ether was added. The reaction product exhibited a melting point of 169–170 degrees centigrade. A benzene solution of the reaction product imparted a black color to paper coated with a mixture of kaolin and phenolic polymer.

EXAMPLE 3

Preparation of 2'-anilino-6'-diethylaminofluoran

One gram of the crude reaction product prepared in Example 1, above, was heated to 250–260 degrees centigrade for about one hour to decarboxylate the crude product. It was then dissolved in 150 milliliters of benzene and the solution was washed with 2–50 milliliter portions of 1 percent, by weight, aqueous sodium carbonate solution followed by a wash with water. The washed benzene solution was concentrated to about 50 milliliters by evaporation and the reaction product was precipitated using petroleum ether. The product was chromatographically purified over activated alumina and recrystallized from benzene-petroleum ether. The purified reaction product exhibited a melting point of 196–197 degrees centigrade and a benzene solution of its imparted a green color to paper coated with a mixture of kaolin and phenolic polymer.

EXAMPLE 4

Preparation of 2'-(3-carboxy-2-naphthylamino)-6'-diethylaminofluoran 0.2 gram of 2'-amino-6'-diethylaminofluoran, the starting fluoran material of Example 1 above, was refluxed for about 30 minutes with 0.13 gram 2-bromo-3-naphthoic acid, 0.08 gram of potassium carbonate, 10 milligrams of copper powder, and 5 milliliters of n-amyl alcohol. The system was then shaken with a mixture of 50 milliliters of water and 100 milliliters of benzene. The aqueous layer was washed with benzene and was acidified to a pH of about 3. The precipitate which formed on acidification was extracted with 150 milliliters of benzene and the desired compound was isolated from the benzene by evaporation. A benzene solution of the product imparted a green color to paper coated with a mixture of kaolin and phenolic polymer.

EXAMPLE 5

Preparation of 2'-(3-carbomethoxy-2-naphthylamino)-6'-diethylaminofluoran

Material from the product of Example 4, above, was methylated according to the procedure described in Example 2, above. A benzene solution of the resulting product imparted a green color to paper coated with a mixture of kaolin and phenolic polymer.

EXAMPLE 6

Preparation of 2'-(2-carboxyanilino)-6'-diethylamino-3'-methylfluoran

The reaction of this example was conducted according to the same procedure as that described in Example 1, above, and also using the same materials, in like amounts, as described in Example 1, above, with the exception that 3-methyl-4-nitrophenol was substituted for p-nitrophenol in preparation of the fluoran starting material. The fluoran starting material of this example is 2'-amino-6'-diethylamino-3'-methylfluoran.

Purification of the title material of this example was conducted by suspending the crude product in a dilute, aqueous, potassium carbonate solution, washing the solution with benzene, acidifying the washed solution to about pH 4 and extracting the precipitate which thereby formed with benzene. The product exhibited a melting point of 253–255 degrees centigrade. A benzene solution of the product imparted a purple color to paper coated with a mixture of kaolin and phenolic polymer.

EXAMPLE 7

Preparation of 2'-(2-carbomethoxyanilino)-6'-diethylamino-3'-methylfluoran

A portion of the product prepared in Example 6, above, was methylated according to the procedure of Example 2, above. A benzene solution of the product imparted a purple color to paper coated with a mixture of kaolin and phenolic polymer.

EXAMPLE 8

Preparation of 2'-anilino-6'-diethylamino-3'-methylfluoran

A portion of the product prepared in Example 6, above, was decarboxylated according to the procedure of Example 3, above. The product exhibited a melting point of 195–198 degrees centigrade. A benzene solution of the product imparted a black color to paper coated with a mixture of kaolin and phenolic polymer.

EXAMPLE 9

Preparation of 2'-(3-carboxy-2-naphthylamino)-6'-diethylamino-3'-methylfluoran

This compound was prepared and isolated using the procedures and materials of Example 4, above, except that 2'-amino-6'-diethylamino-3'-methylfluoran was substituted for the 2'-amino-6'-diethylaminofluoran of Example 4. Preparation of 2'-amino-6'-diethylamino-3'-methylfluoran as a starting fluoran material is discussed in Example 6, above. A benzene solution of the product of this example imparted a dark gray-green color to paper coated with a mixture of kaolin and phenolic polymer.

EXAMPLE 10

Preparation of 2'-(3-carbomethoxy-2-naphthylamino)-6'-diethylamino-3'-methylfluoran Material from the product of Example 9, above, was methylated according to the procedure described in Example 2, above. A benzene solution of the resulting product imparted a dark grayish-green color to paper coated with a mixture of kaolin and phenolic polymer.

EXAMPLE 11

Preparation of 5 (and 6)-(2-carboxyanilino)-2'-chloro-6'-diethylamino-3'-methylfluoran 5 (and 6)-amino-2'-chloro-6'-diethylamino-3-methylfluoran, a starting material in the reaction of this example, is prepared as follows: 5 grams of m-diethylaminophenol, 5.8 grams of 4-nitrophthalic anhydride and 100 milliliters of benzene are refluxed together for about three hours. The reaction mixture is extracted by sodium carbonate solution and the extract is acidified. The precipitate which is thus thrown down between pH 6 and 2 is collected and is heated with 3-methyl-4-chlorophenol in 80 percent, by weight, sulfuric acid for about 3 hours at 95–105 degrees centigrade. The resulting reaction product is reduced with stannous chloride solution and is extracted with benzene.

To obtain the title compounds of this example: 0.43 gram of the above-prepared 5 (and 6)-amino-2'-chloro-6'-diethylamino-3'-methylfluoran, 0.2 gram of o-bromobenzoic acid, 0.14 gram of potassium carbonate, 10 milligrams of copper powder, and 5 milliliters of n-amyl alcohol were refluxed for about 3 hours. The product of the reaction was isolated and purified by the procedure discussed in Example 1, above. A benzene solution of the purified product imparted a red color to paper coated with a mixture of kaolin and phenolic polymer.

EXAMPLE 12

One gram of 2'-carboxy-4-diethylamino-2-hydroxybenzophenone was dissolved in a mixture of 4 ml. of concentrated sulfuric acid and an equal volume of fuming sulfuric acid at a $SO_3$ content of 20% under external cooling to about 15° C. with mechanical stirring. To the solution were added 1.9 grams of 4-anilino-3-methylphenol in small portions, and stiring was continued for 16 hours at about 20° C. The reaction mixture was poured into 200 grams of ice-water, basified with 10% aqueous NaOH, and extracted with benzene. The benzene solution was washed with 10% aqueous NaOH, 2% aqueous NaCl, and finally with water. After concentrating to about 40 ml., it was chromatographed on activated alumina. Eluting with benzene removed an orange dye from the column. The desired product, 2'-anilino-6'-diethylamino-3'-methylfluoran, was eluted 3:3:1 mixture of benzene-ether-ethyl acetate, exhibiting a weight of 1.17 grams melting point 194–196. The yield was calculated to be 77 percent of theory.

What is claimed is:
1. A pressure sensitive record unit comprising:
    (a) support web or sheet material,
    (b) mark-forming components and a releasable liquid solvent for said mark-forming components arranged in contiguous juxtaposition and supported by said sheet material,
    (c) said mark-forming components comprising at least one chromogenic material of the structure:

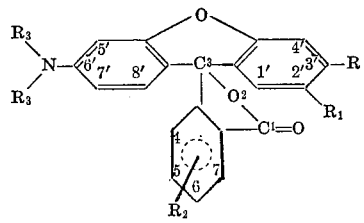

wherein:
one of $R_1$ and $R_2$ represents a chemical radical selected from the group consisting of

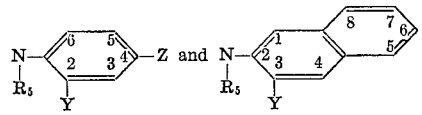

wherein $R_5$ represents a chemical radical selected from the group consisting of an alkyl radical having less than five carbon atoms and hydrogen, Z represents a chemical radical selected from the group consisting of nitro-, amino-, alkyl radicals having less than five carbon atoms and hydrogen, and Y represents a chemical radical selected from the group consisting of nitro-, amino-, hydrogen, carboxyl (—COOH), and ester (—COOR$_4$) wherein $R_4$ represents an alkyl chemical radical having less than five carbon atoms;
the remaining one of $R_1$ and $R_2$ represents a chemical radical selected from the group consisting of amino-, nitro-, chlorine, alkyl having less than five carbon atoms, acetamido and hydrogen;
R represents a chemical radical selected from the group consisting of hydrogen and alkyl radicals having less than five carbon atoms; and
$R_3$ represents alkyl radicals having less than five carbon atoms;
and an electron-accepting material of the Lewis acid type reactive with said chromogenic material to produce a mark; which components upon pressure-release of the liquid solvent are brought into reactive contact in the released solvent.

2. The record unit of claim 1 wherein at least one of the mark-forming components is maintained in isolation from the other mark-forming components prior to the release of the solvent.

3. The record unit of claim 1 wherein the liquid solvent is present as the nucleus of a microcapsule.

4. The record unit of claim 1 wherein the chromogenic material is dissolved in the liquid solvent prior to pressure release.

5. The record unit of claim 1 wherein the mark-forming components and the liquid solvent are present in a single support sheet.

6. The record unit of claim 1 wherein at least one member selected from the group consisting of the mark-forming components and the liquid solvent is present in a support sheet other than the support sheet having the remaining members of the group.

7. The record unit of claim 1 where the electron-accepting material of the Lewis acid type comprises a clay.

8. The record unit of claim 1 where the electron-accepting material of the Lewis acid type comprises at least one organic polymer.

9. The record unit of claim 8 wherein the organic polymer is a phenolic polymer.

10. The record unit of claim 9 wherein the mark produced by reactive contact between the phenolic polymer and the chromogenic material is neutral in color and wherein the chromogenic material is at least one material selected from the group of materials consisting of 2'-(2-carbomethoxyanilino)-6'-diethylaminofluoran; 2'-(3-carboxy-2-naphthylamino)-6'-diethylaminofluoran; and 2'-anilino-6'-diethylamino-3'-methylfluoron.

11. A mark-forming unit, comprising: a first web or sheet having on one surface a transfer coating which contains as a finely dispersed phase a plurality of minute, pressure-rupturable capsules containing as an inner phase a solvent vehicle; a second web or sheet having an adherent coating upon its surface or dispersed within said web or sheet, said first and second webs or sheets being maintained disposed together in face-to-face relationship with said respective transfer and adherent coatings in contiguity with each other; a first coating constituent in the form of a substantially colorless or slightly colored chromogenic material which includes as a major functional arrangement the molecular structure

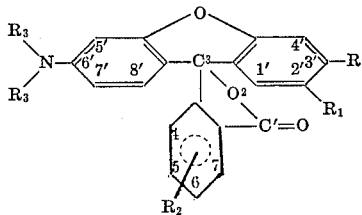

wherein:
one of $R_1$ and $R_2$ represents a chemical radical selected from the group consisting of

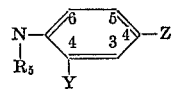

and

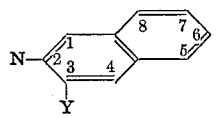

wherein $R_5$ represents a chemical radical selected from the group consisting of an alkyl radical having less than five carbon atoms and hydrogen, Z represents a chemical radical selected from the group consisting of nitro-, amino-, alkyl radicals having less than five carbon atoms, and hydrogen, and Y represents a chemical radical selected from the group consisting of nitro-, amino-, hydrogen, carboxyl (—COOH), and ester (COOR$_4$) wherein $R_4$ represents an alkyl chemical radical having less than five carbon atoms;

the remaining one of $R_1$ and $R_2$ represents a chemical radical selected from the group consisting of amino-, nitro-, chlorine, alkyl having less than five carbon atoms, acetamido and hydrogen;

R represents a chemical radical selected from the group consisting of hydogen and alkyl radicals having less than five carbon atoms; and $R_3$ represents alkyl radicals having less than five carbon atoms;

and a second constituent in the form of an electron-accepting material of the Lewis acid type; one of said constituents being dissolved in said solvent liquid vehicle present as the inner phase of the plurality of minute pressure-rupturable capsules in the transfer coating on or within said first web or sheet, and the other of said coating constituents being bonded to said second web in said adherent coating thereon but being accessible to other materials coming into contact with portions of the adherent coating, whereby, upon local impact and rupture of said capsules, releasing said liquid vehicle containing one coating constituent from at least some of the capsules onto said contiguous adherent coating, reactive contact is effected between said two constituents to produce a dark-colored material by the action of said electron-accepting material of the Lewis acid type upon said chromogenic material to effect color change in said chromogenic compound to said dark-colored material.

12. The mark-forming unit of claim 11 in which the electron-accepting material of the Lewis acid type comprises a clay.

13. The mark-forming unit of claim 11 in which the electron-accepting material of the Lewis acid type comprises an organic polymer.

14. The mark-forming unit of claim 11 in which the organic polymer is a phenolic polymer.

15. The mark-forming unit of claim 14 wherein the mark produced by reactive contact between the phenolic polymer and the chromogenic material is neutral in color and wherein the chromogenic material is at least one material selected from the group of materials consisting of 2'-(2-carbomethoxyanilino)-6'-diethylaminofluoran; 2'-(3-carboxy-2-naphthylamino)-6'-diethylaminofluoran; and 2'-anilino-6'-diethylamino-3'-methylfluoran.

References Cited
UNITED STATES PATENTS 3,501,331   3/1970   Kimura et al. _____ 117—36.2

MURRAY KATZ, Primary Examiner

U.S. Cl. X.R.

117—36.8, 155 L; 260—335